(12) United States Patent
Kutsch et al.

(10) Patent No.: US 12,305,370 B2
(45) Date of Patent: May 20, 2025

(54) SANITARY FAUCET HAVING A HOSE

(71) Applicant: Grohe AG, Hemer (DE)

(72) Inventors: Christian Kutsch, Dortmund (DE); Wulf Woesthoff, Hemer (DE); Matthias Schlueter, Dortmund (DE)

(73) Assignee: GROHE AG, Hemer (DE)

( * ) Notice: Subject to any disclaimer, the term of this patent is extended or adjusted under 35 U.S.C. 154(b) by 152 days.

(21) Appl. No.: 18/122,983

(22) Filed: Mar. 17, 2023

(65) Prior Publication Data

US 2023/0295906 A1  Sep. 21, 2023

(30) Foreign Application Priority Data

Mar. 18, 2022 (DE) .................. 102022106361.5

(51) Int. Cl.
*E03C 1/02* (2006.01)
*E03C 1/04* (2006.01)
*F16L 11/22* (2006.01)

(52) U.S. Cl.
CPC ............ *E03C 1/025* (2013.01); *E03C 1/0404* (2013.01); *F16L 11/22* (2013.01)

(58) Field of Classification Search
CPC ......... E03C 1/025; E03C 1/0404; F16L 11/22
USPC ........................................................... 4/678
See application file for complete search history.

(56) References Cited

U.S. PATENT DOCUMENTS

| | | | |
|---|---|---|---|
| 6,692,037 B1* | 2/2004 | Lin ..................... | F16L 11/22 |
| | | | 285/124.1 |
| 2007/0000550 A1* | 1/2007 | Osinski .............. | F16L 11/22 |
| | | | 138/111 |
| 2007/0158460 A1 | 7/2007 | Lev | |
| 2018/0045342 A1* | 2/2018 | Gonzalez .......... | E03C 1/025 |
| 2019/0032309 A1* | 1/2019 | Stein ................. | E03C 1/0404 |
| 2021/0003236 A1* | 1/2021 | Echtle .............. | F16L 33/2073 |
| 2022/0049479 A1 | 2/2022 | Mainka et al. | |
| 2023/0084742 A1* | 3/2023 | Dahan .............. | B67D 1/0888 |
| | | | 222/145.5 |
| 2023/0203792 A1* | 6/2023 | Mainka ............ | E03C 1/0405 |
| | | | 239/436 |
| 2024/0337333 A1* | 10/2024 | Barnett ............ | F16L 11/087 |

FOREIGN PATENT DOCUMENTS

| | | |
|---|---|---|
| DE | 10 2018 007 226 | 3/2020 |
| GB | 2 110 331 | 6/1983 |
| WO | 2009/076981 | 6/2009 |

\* cited by examiner

*Primary Examiner* — Huyen D Le
(74) *Attorney, Agent, or Firm* — Wenderoth, Lind & Ponack, L.L.P.

(57) ABSTRACT

A sanitary faucet (1) having at least:
  a faucet housing (2) having an outlet (3) and an outlet opening (4); and
  a hose (5) made of silicone having at least one first lumen (6) for routing a first liquid from a first source of liquid (7) to the outlet opening (4), a second lumen (8) for routing a second liquid from a second source of liquid (9) to the outlet opening (4) and a third lumen (10) for routing a third liquid from a third source of liquid (11) to the outlet opening (4), wherein the hose (5) contains at least in part a jacket (12).

14 Claims, 2 Drawing Sheets

SANITARY FAUCET HAVING A HOSE

Figure 1:
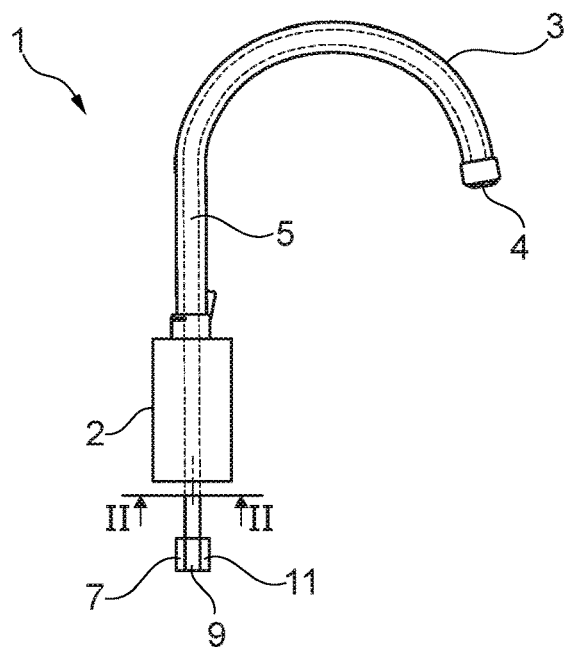

The present invention relates to a sanitary faucet, which can be used in particular in conjunction with sinks and/or wash basins.

Sanitary faucets on sinks, wash basins, bath tubs and/or showers are used for the provision of a liquid, in particular water, as needed. To this end, sanitary faucets can have a housing having an outlet and an outlet opening for the liquid. The housing of the sanitary faucet can be fixed on a support, for example a countertop or a sink or wash basin. Furthermore, sanitary faucets can have a mixing valve or a mixing cartridge, by means of which the cold water and hot water can be mixed to mixed water having a desired mixed-water temperature. In addition, sanitary faucets are known, which can be used to draw different liquids, for example mixed water, carbonated liquid, flavored liquid, filtered liquid, cooled liquid and/or hot water. In order to route the different liquids from their respective sources to the outlet opening, several liquid lines are required, which extend in parallel to one another through the faucet housing and/or the outlet. This means high space requirements for the liquid lines, thereby restricting the design flexibility of the faucet housing or outlets.

Therefore, the invention addresses the question of at least partially solving the problems described with respect to the prior art, and in particular specifying a sanitary faucet, through which the different or several liquids can be routed to the outlet opening to the outlet opening while saving space.

This problem is solved by a sanitary faucet according to the features of the independent patent claim. Further advantageous embodiments are specified in the dependent patent claims. It should be noted that the individual features listed in the dependent patent claims can be combined with one another in any technologically feasible manner and define further embodiments of the invention. Moreover, the features specified in the patent claims are defined in more detail and explained in the description, wherein further preferred embodiments of the invention are presented.

A sanitary faucet having at least the following components contributes to this end:
- a faucet housing having an outlet and an outlet opening; and
- a hose made of silicone having at least one first lumen for routing a first liquid from a first source of liquid to the outlet opening, a second lumen for routing a second liquid from a second source of liquid to the outlet opening and a third lumen for routing a third liquid from a third source of liquid to the outlet opening, wherein the hose comprises a jacket, at least in part.

The sanitary faucet is used in particular for the provision of liquids, such as in particular water, as needed at sinks and/or wash basins. The sanitary faucet comprises a faucet housing, which in particular can consist at least partially of plastic and/or (cast) metal, for example, such as brass. The faucet housing can be fixed on a support, for example a countertop, the sink or wash basin, and/or has an (projecting or branching) outlet, which is rigidly or moveably connected to the faucet housing. The outlet can be at least partially tubular and/or has an outlet opening. The outlet opening can, for example be designed in the manner of a spray plate or mousseur.

The sanitary faucet has a hose made of silicone. The hose can extend at least partially through the faucet housing and/or the outlet. The hose has in particular a round cross-section. The silicone is a material approved and/or suitable for drinking water. The silicone can have in particular at least one, several or even all of the properties listed below:
- is temperature-resistant from −40° C. to 200° C. [Celsius];
- is translucent;
- has a thickness of 1.22 g/cm$^3$ [grams per cubic centimeter] to 1.26 g/cm$^3$, preferably (approx.) 1.24 g/cm$^3$;
- has a tensile strength of 8.6 N/mm$^2$ [newtons per square millimeter] to 8.8 N/mm$^2$, preferably (approx.) 8.7 N/mm$^2$;
- has an elongation at break of 390% to 410%, preferably (approx.) 400%;
- has a tear propagation resistance of 30 N/mm [newtons per millimeter] to 34 N/mm, preferably (approx.) 32 N/mm.

The hose has at least one first lumen for routing a first liquid from a first source of liquid to the outlet opening, a second lumen for routing a second liquid from a second source of liquid to the outlet opening and a third lumen for routing a third liquid from a third source of liquid to the outlet opening. In addition, the hose can have at least one further lumen for routing at least one further liquid from at least one further source of liquid. In particular, in each case, the lumen is a (tubular) liquid channel, which extends through the hose from a first longitudinal end of the hose to a second longitudinal end of the hose. The first longitudinal end of the hose can be connected to the first source of liquid, second source of liquid and third source of liquid (and if applicable, the at least one further source of liquid). Alternatively, the first longitudinal end of the hose can be connected to a distributor device for the at least one first source of liquid, second source of liquid and third source of liquid (and if applicable, for the at least one further source of liquid). The distributor device can be connected to the first source of liquid, second source of liquid and third source of liquid (and if applicable, further sources of liquid). The second longitudinal end of the hose can be connected to the outlet opening. The distributor device can be arranged outside of the faucet housing and/or outside of the outlet. The individual lumens extend in particular in parallel to one another through the hose and/or are limited by the silicone. Due to the silicone, the lumens are integrally formed in particular (jointly). The lumens in particular do not extend concentrically. The hose can be embodied in the manner of a multilumen hose.

The first liquid can be mixed water, for example, and/or the first source of liquid can be a mixing valve or a mixing cartridge, for example. In particular, cold water can be mixed at a cold-water temperature and hot water can be mixed at a hot-water temperature into the mixed water at a desired mixed-water temperature by the mixing valve or the mixing cartridge. The cold-water temperature is a maximum 25° C., preferably 1° C. to 25° C., especially preferably 5° C. to 20° C. and/or the hot-water temperature in particular is a maximum 90° C., preferably 25° C. to 90° C., especially preferably 55° C. to 65° C. The mixing valve or the mixing cartridge can be arranged in the faucet housing of the sanitary faucet. For example, the second liquid, the third liquid and/or the at least one further liquid can be drinking water, mixed water, cold water, hot water, carbonated liquid, flavored liquid, filtered liquid, cooled liquid (for example having a cooling-water temperature of 1° C. to 10° C.) and/or hot water (for example with a hot-water temperature of 90° C. to 100° C.).

The hose comprises at least in part a jacket. Preferably, the hose comprises a jacket from its first longitudinal end to its second longitudinal end. The jacket covers the hose, in particular completely or by 360°. In particular, the jacket can protect the hose from damages, external influences, kinking and/or bursting (for example due to excessive liquid pressure in the lumens). The jacket is in particular flexible in design, so that the hose with the jacket is flexible.

At least three liquids can be supplied separately from one another through a single hose of the outlet opening, which as a result reduces the space requirements in the faucet housing or the outlet.

The silicone can have a hardness of 70 to 85 Shore A. The hardness of the silicone can be preferably 73 to 83 Shore A, especially preferably (circa) 78 Shore A.

The jacket can be embodied on an outer surface of the hose. In particular, the jacket can be embodied on the outer surface of the hose in such a way that the jacket (substantially) cannot shift relative to the hose and/or there is no gap between the jacket and the hose. Without the jacket, the hose can have a first outer diameter of for example 10 mm to 15 mm, preferably 12.5 mm to 13.5 mm. With the jacket, the hose can have a second outer diameter of for example 12 mm to 18 mm, preferably 14 mm to 15 mm.

Tensile forces acting on the hose can be transferred at least partially into the jacket. As a result, the silicone of the hose can be relieved from tension or protected from damages.

The jacket can be a mesh made of wire or at least one filament. Hence, the jacket can be embodied in the manner of a "braiding". For example, the jacket can comprise 3 to 8 wires and/or filaments, preferably 5 wires and/or filaments. The at least one filament can consist at least partially of a, in particular of a thermoplastic, plastic.

The wire can comprise stainless steel.

The at least one filament can comprise polyethylene terephthalate (PET).

A first cross-section of the first lumen can be semicircular. The first cross-section is in particular aligned orthogonally to a longitudinal axis of the hose.

A second cross-section of the second lumen and/or a third cross-section of the third lumen can be partially circular. The at least one further lumen can be partially circular. In particular, the second cross-section of the second lumen and/or the third cross-section of the third lumen can be quarter-circular. The second cross-section and/or the third cross-section are in particular aligned orthogonally to the longitudinal axis of the hose.

The first lumen is separated from the second lumen, the third lumen and/or the at least one further lumen, in particular by a first partition. The second lumen, third lumen and/or the at least one further lumen are separated from one another, in particular by at least one second partition. The first partition has in particular a first thickness of for example 1 mm to 1.5 mm and/or the second partition has in particular a second thickness of for example 1 mm to 1.5 mm.

The first lumen, second lumen, third lumen and/or the at least one further lumen can each have an inner wall oriented in the direction of the outer surface of the hose with a lumen radius. The lumen radius can be for example 4 mm to 8 mm, preferably 5 mm to 6 mm, especially preferably (circa) 5.5 mm.

First corners of a first cross-section of the first lumen, second corners of a second cross-section of the second lumen and/or third corners of a third cross-section of the third lumen can have a radius of 0.4 mm to 0.6 mm. Preferably, the radius can be (circa) 0.5 mm. As a result, a flow resistance of the liquid in the lumens can be reduced, without reducing a lumen cross-section of the individual lumens too drastically.

Figure 2:
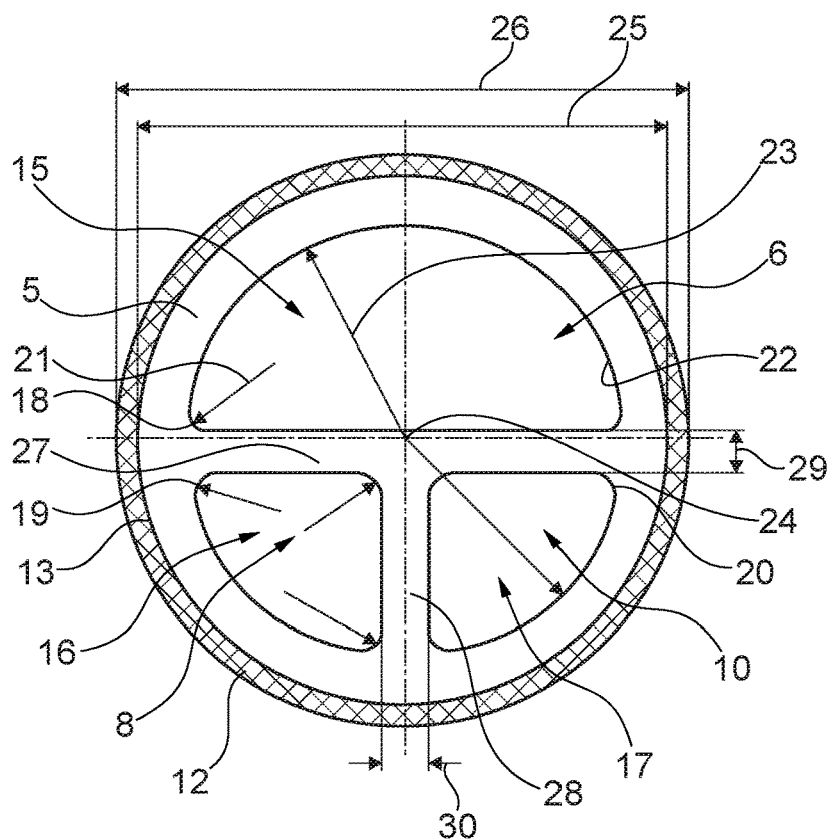
Figure 3:
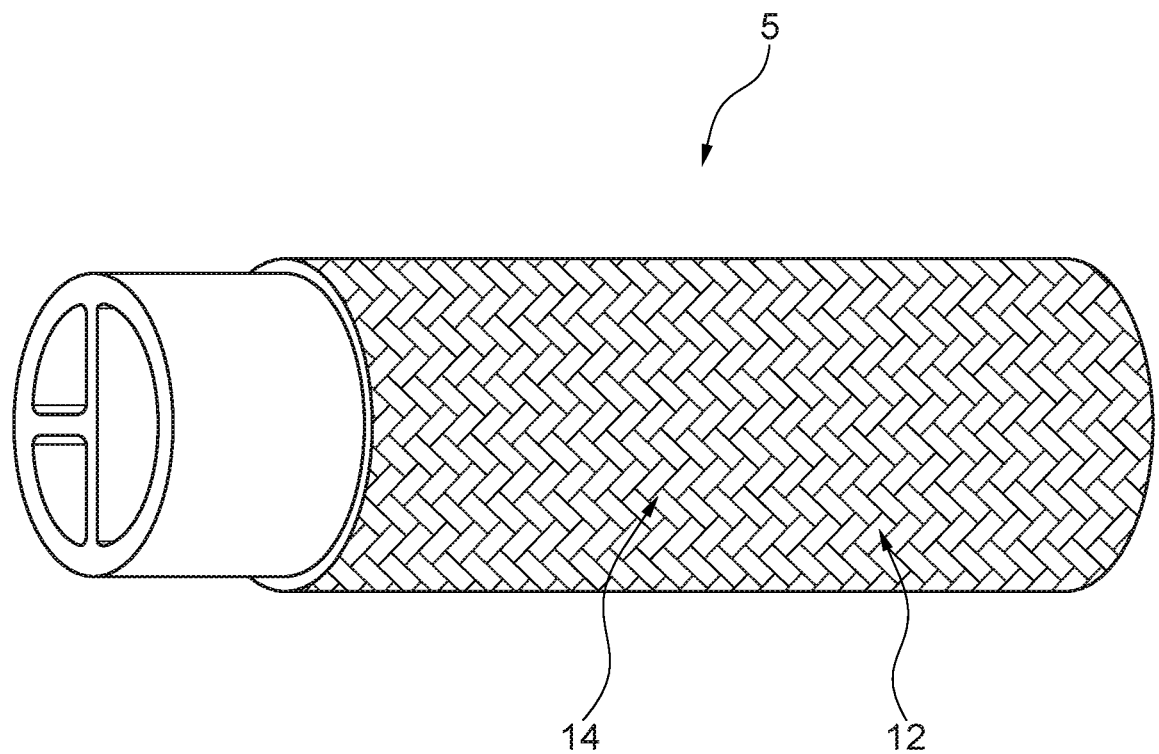

Subsequently, the invention and the technical environment will be explained in greater detail based on the figures. It should be noted that the figures show an especially preferable embodiment variant of the invention, but the invention is not limited thereto. Identical components in the figures have been provided with the same reference numerals. The figures show the following by way of example and schematically:

FIG. 1: a lateral view of a sanitary faucet;
FIG. 2: a cross-section of a hose of the sanitary faucet;
FIG. 3: a perspective representation of the hose FIG. 1 shows a lateral view of a sanitary faucet 1. The sanitary faucet 1 has a faucet housing 2, which comprises a rotatably supported outlet 3 having an outlet opening 4. The faucet housing 2 can be fixed on a support not shown here. A hose 5 made of silicone, whose first lumen 6 shown in FIG. 2 connects a first source of liquid 7 to the outlet opening 4, whose second lumen 8 connects a second source of liquid 9 to the outlet opening 4 and whose third lumen 10 connects a third source of liquid 11 to the outlet opening 4, extends through the sanitary faucet 1.

FIG. 2 shows the hose 5 in a sectional representation along the intersecting line II-II shown in FIG. 1. The first lumen 6 is semicircular. The second lumen 8 and the third lumen 10 are quarter-circular. The lumens 6, 8, 10 each comprise an inner wall 22 oriented in the direction of an outer surface 13 of the hose 5 having a lumen radius 23 about a center 24 of the hose 5. A first cross-section 15 of the first lumen 6 comprises first corners 18, a second cross-section 16 of the second lumen 8 comprises second corners 19, and a third cross-section 17 of the third lumen 10 comprises third corners 20, each having a radius 21.

There is a jacket 12 on the outer surface 13 of the hose 5. Without the jacket 12, the hose 5 has a first outer diameter 25 and with the jacket 12, it has a second outer diameter 26. The first lumen 6 is separated from the second lumen 8 and third lumen 10 by a first partition 27. The second lumen 8 and the third lumen 10 are separated from each other by a second partition 28. The first partition 27 has a first thickness 29 and the second partition 28 has a second thickness 30.

FIG. 3 shows a perspective representation of the hose 5. In particular, it can be seen here that the jacket 12 is embodied in the manner of a mesh 14.

By means of this invention, the liquids can be routed to the outlet opening 4 while saving space.

LIST OF REFERENCES

1 Sanitary faucet
2 Faucet housing
3 Outlet
4 Outlet opening
5 Hose
6 First lumen
7 First source of liquid
8 Second lumen
9 Second source of liquid
10 Third lumen
11 Third source of liquid
12 Jacket
13 Outer surface
14 Mesh
15 First cross-section
16 Second cross-section
17 Third cross-section
18 First corner
19 Second corner 20 Third corner
21 Radius
22 Inner wall
23 Lumen radius
24 Center
25 First outer diameter
26 Second outer diameter
27 First partition
28 Second partition
29 First thickness
30 Second thickness

The invention claimed is:

1. A sanitary faucet (1) comprising:
a faucet housing (2) having an outlet (3) and an outlet opening (4); and
a single hose (5) made of silicone, the single hose (5) having a first lumen (6), a second lumen (8), and a third lumen (10) running parallel through the single hose (5),
wherein the first lumen (6) routes a first liquid from a first source of liquid (7) to the outlet opening (4),
wherein the second lumen (8) routes a second liquid from a second source of liquid (9) to the outlet opening (4), and
wherein the third lumen (10) routes a third liquid from a third source of liquid (11) to the outlet opening (4),
wherein the single hose (5) has a first partition (27) separating the first lumen (6) from the second lumen (8) and the third lumen (10) such that the first lumen (6) has an orthogonal cross-section (15) to a longitudinal axis of the single hose (5) that is a semicircle,
wherein the single hose (5) has a second partition (28) separating the second lumen (8) and the third lumen (10) such that both the second lumen (8) and the third lumen (10) have orthogonal cross-sections (16, 17) to the longitudinal axis of the single hose (5) that are quarter circles, and
wherein the hose (5) comprises at least in part a jacket (12).

2. The sanitary faucet (1) according to claim 1, wherein the silicone has a hardness of 70 to 85 Shore A.

3. The sanitary faucet (1) according to claim 1, wherein the jacket (12) is embodied on an outer surface (13) of the hose (5).

4. The sanitary faucet (1) according to claim 1, wherein tensile forces acting on the hose (5) can be transferred as least partially into the jacket (12).

5. The sanitary faucet (1) according to claim 1, wherein the jacket (12) is a mesh (14) made of wire or at least one filament.

6. The sanitary faucet (1) according to claim 5, wherein the wire comprises stainless steel.

7. The sanitary faucet (1) according to claim 5, wherein the at least one filament comprises polyethylene terephthalate (PET).

8. The sanitary faucet (1) according to claim 1, wherein first corners (18) of the cross-section (15) of the first lumen (6), second corners (19) of the second cross-section (16) of the second lumen (8), and third corners (20) of the third cross-section (17) of the third lumen (10) have a radius (21) of 0.4 mm to 0.6 mm.

9. The sanitary faucet (1) according to claim 1, wherein the first lumen (6), the second lumen (8), and the third lumen (10) do not extend concentrically in the single hose (5).

10. The sanitary faucet (1) according to claim 1, wherein the first liquid is mixed water from a mixing valve or a mixing cartridge as the first source of liquid (7).

11. The sanitary faucet (1) according to claim 1, wherein the second liquid is selected from the group consisting of drinking water, mixed water, cold water, hot water, carbonated liquid, flavored liquid, filtered liquid, and cooled liquid.

12. The sanitary faucet (1) according to claim 1, wherein the third liquid is selected from the group consisting of drinking water, mixed water, cold water, hot water, carbonated liquid, flavored liquid, filtered liquid, and cooled liquid.

13. The sanitary faucet (1) according to claim 1, wherein the first partition (27) extends straight across the single hose (5).

14. The sanitary faucet (1) according to claim 1, wherein the second partition (28) extends perpendicular from the first partition (27) to an inner wall of the single hose (5).

* * * * *